United States Patent [19]
Poinsard

[11] Patent Number: 5,847,675
[45] Date of Patent: Dec. 8, 1998

[54] RADAR WITH A WIDE INSTANTANEOUS ANGULAR FIELD AND A HIGH INSTANTANEOUS ANGULAR RESOLUTION IN PARTICULAR FOR A MISSILE HOMING HEAD

[76] Inventor: Henri Poinsard, La Riquière Saint Reginier, 76460 St. Valery en Caux, France

[21] Appl. No.: 594,438

[22] Filed: Sep. 28, 1990

Related U.S. Application Data

[63] Continuation of Ser. No. 94,254, Aug. 25, 1987, abandoned.

[30] Foreign Application Priority Data

Sep. 16, 1986 [FR] France .................................... 86 12938

[51] Int. Cl.⁶ .............................. G01S 13/56; G01S 13/00
[52] U.S. Cl. ............................. 342/81; 244/3.19; 342/62; 342/80; 342/105; 342/149; 342/153; 342/154; 342/157; 342/371
[58] Field of Search .............................. 244/3.19; 342/62, 342/63, 68, 80, 81, 133, 149, 153–157, 196, 371, 373, 104, 105, 107

[56] References Cited

U.S. PATENT DOCUMENTS

| | | | |
|---|---|---|---|
| 3,740,002 | 6/1973 | Schaefer | 244/3.19 |
| 3,943,523 | 3/1976 | Fassett | 342/154 X |
| 4,160,974 | 7/1979 | Stavis | 244/3.19 X |
| 4,562,439 | 12/1985 | Peralta et al. | 342/81 |
| 4,652,879 | 3/1987 | Rudish et al. | 342/371 |

*Primary Examiner*—Bernarr E. Gregory

[57] ABSTRACT

This radar with a wide instantaneous angular field and a high instantaneous angular resolution, in particular for a missile homing head, includes essentially:
 a transmitting antenna with a relatively wide radiation pattern, transmitting a quasi-continuous wave;
 a receiving antenna including a plurality of radiating elements;
 means for formation of beams associated with said receiving antenna, to achieve a linear combination of the signals from the various radiating elements of said receiving antenna, in order to obtain a group of simultaneous reception beams allowing the instantaneous scanning of the airspace covered by said transmitting antenna.

21 Claims, 8 Drawing Sheets

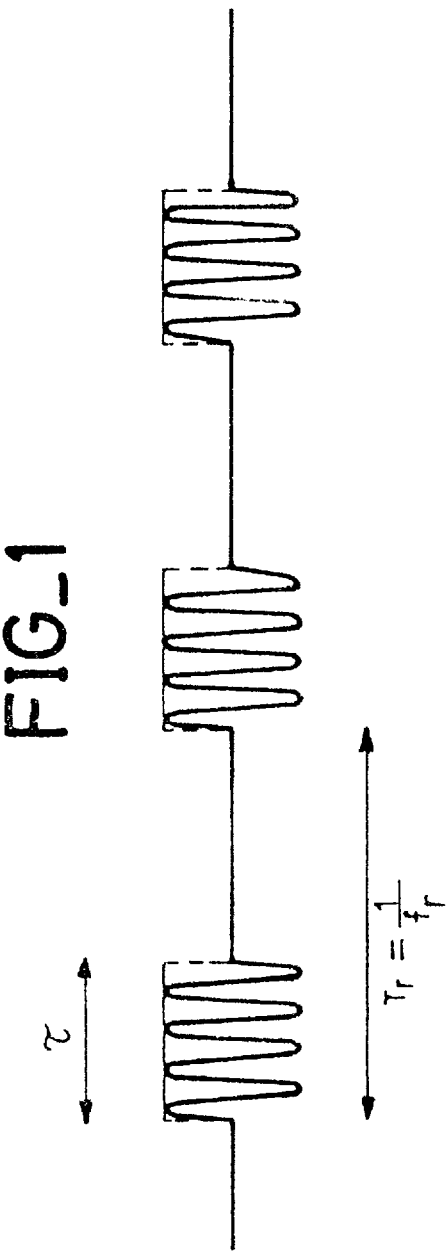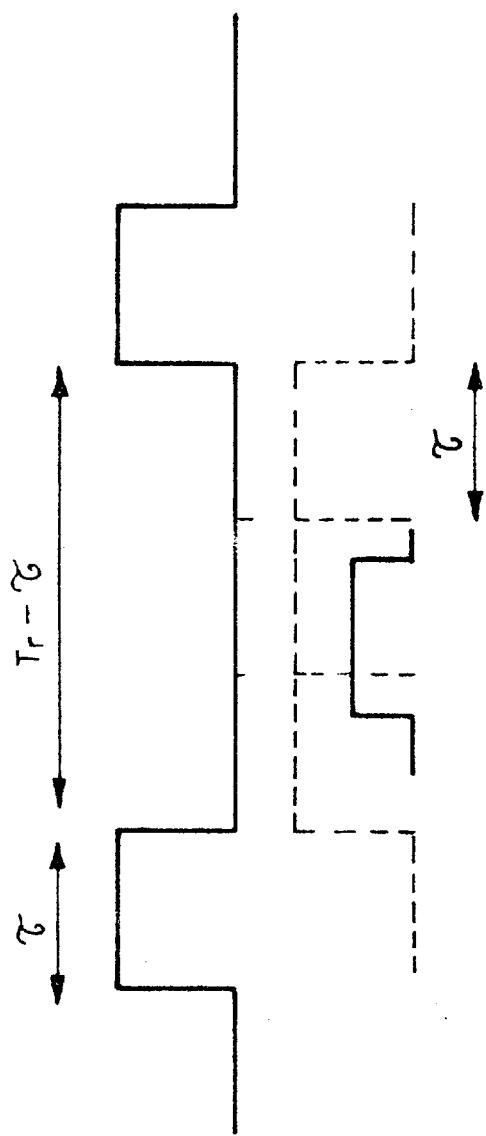

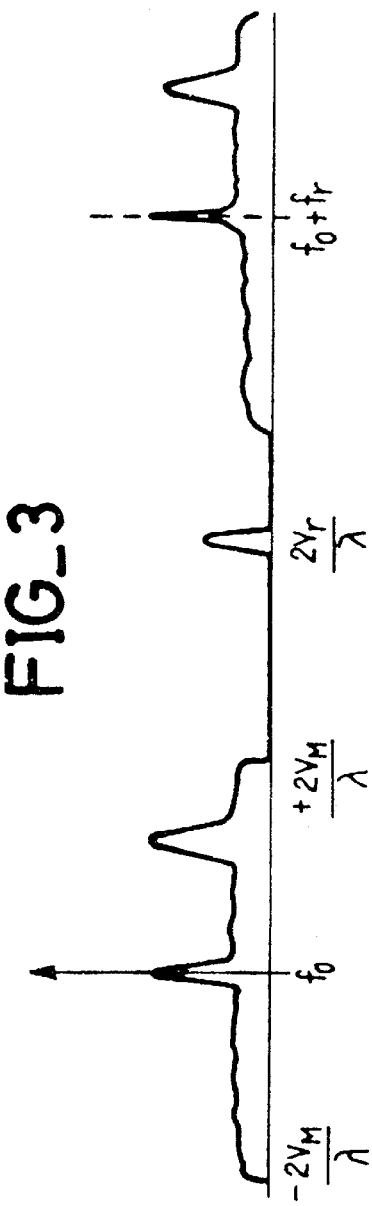
FIG_3
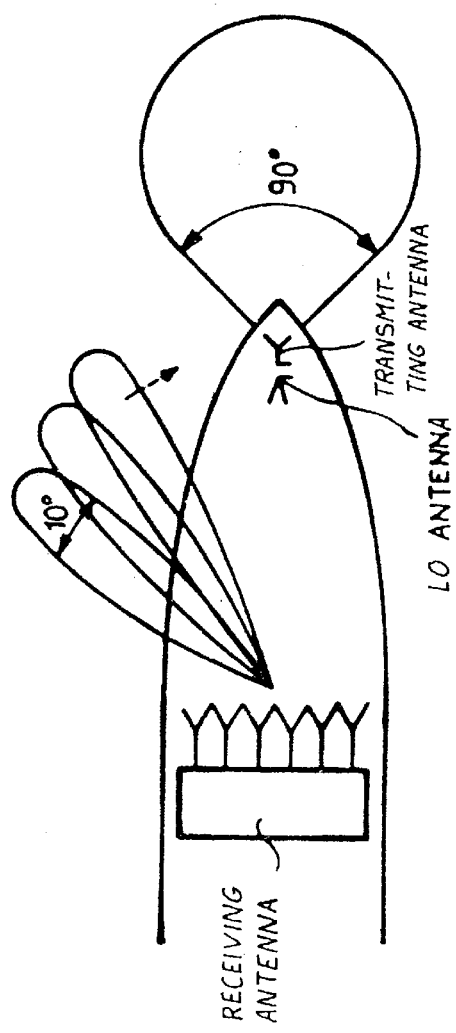
FIG_5
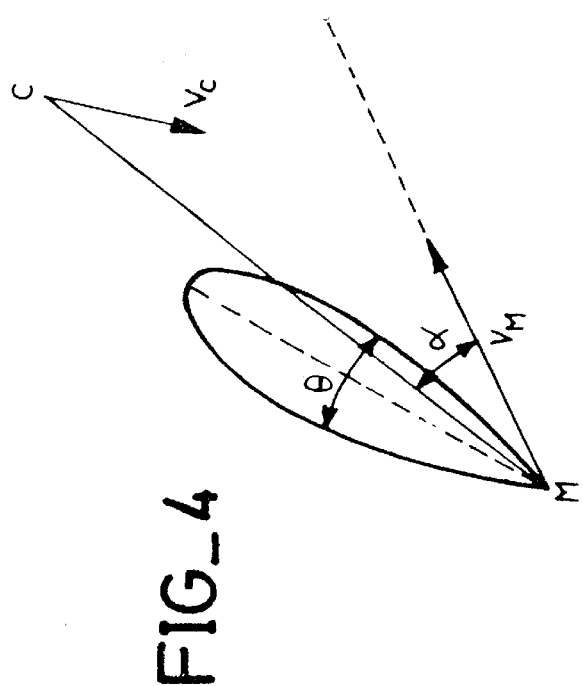
FIG_4

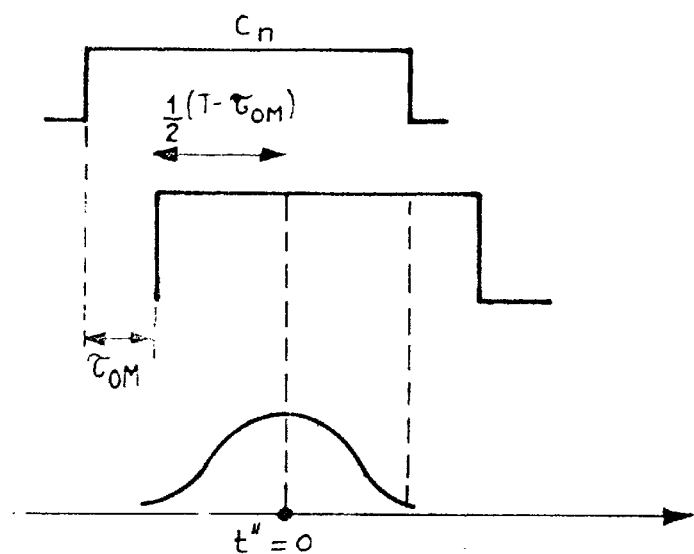
FIG_7
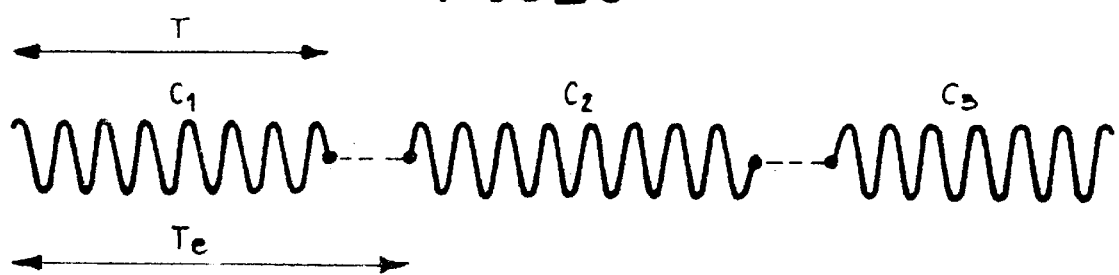
FIG_6

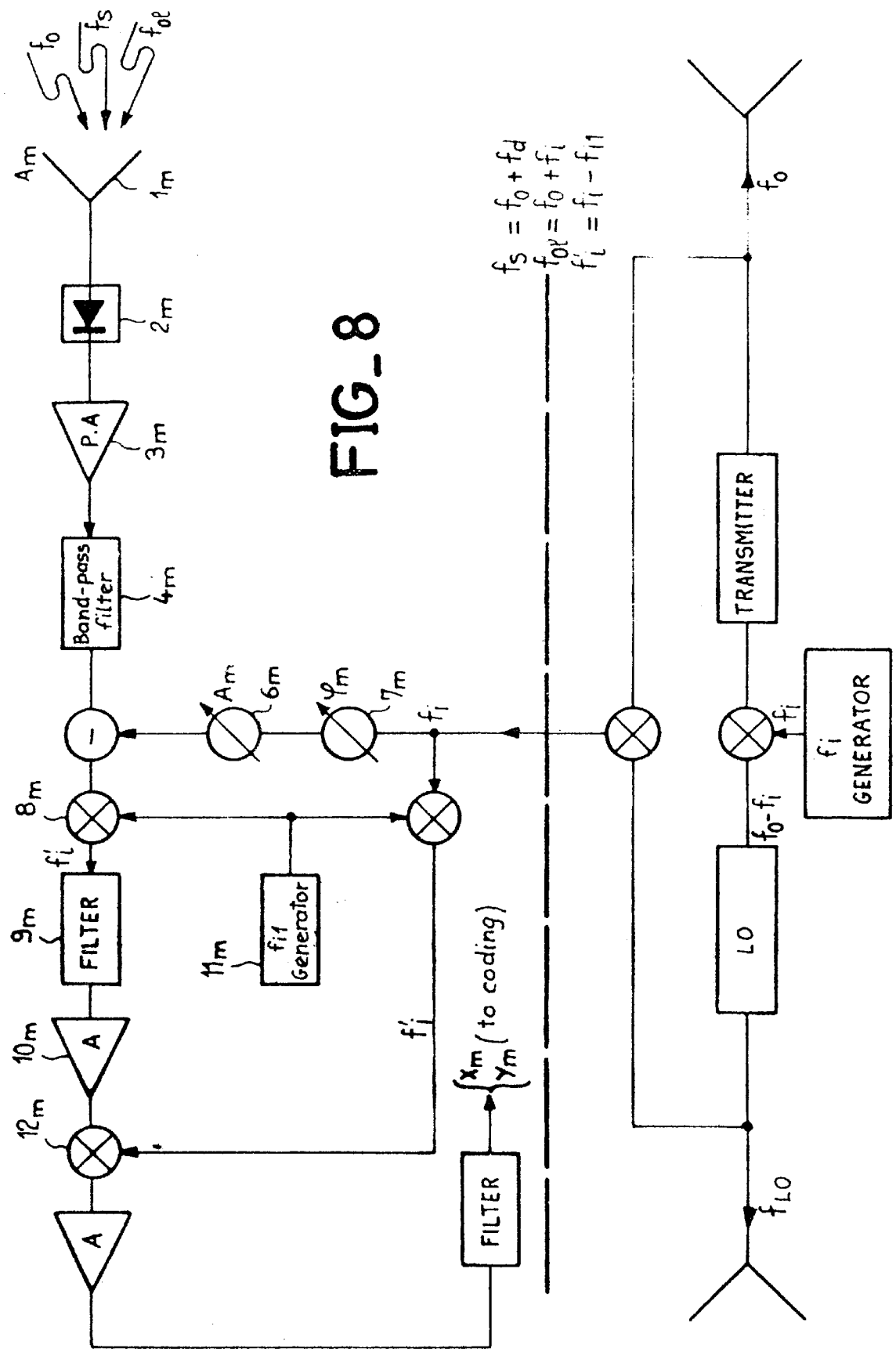

FIG_9
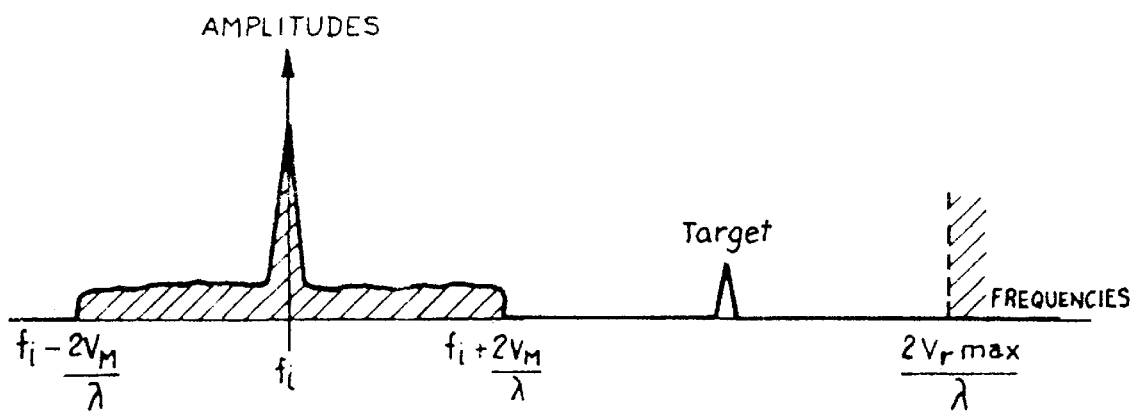
FIG_10
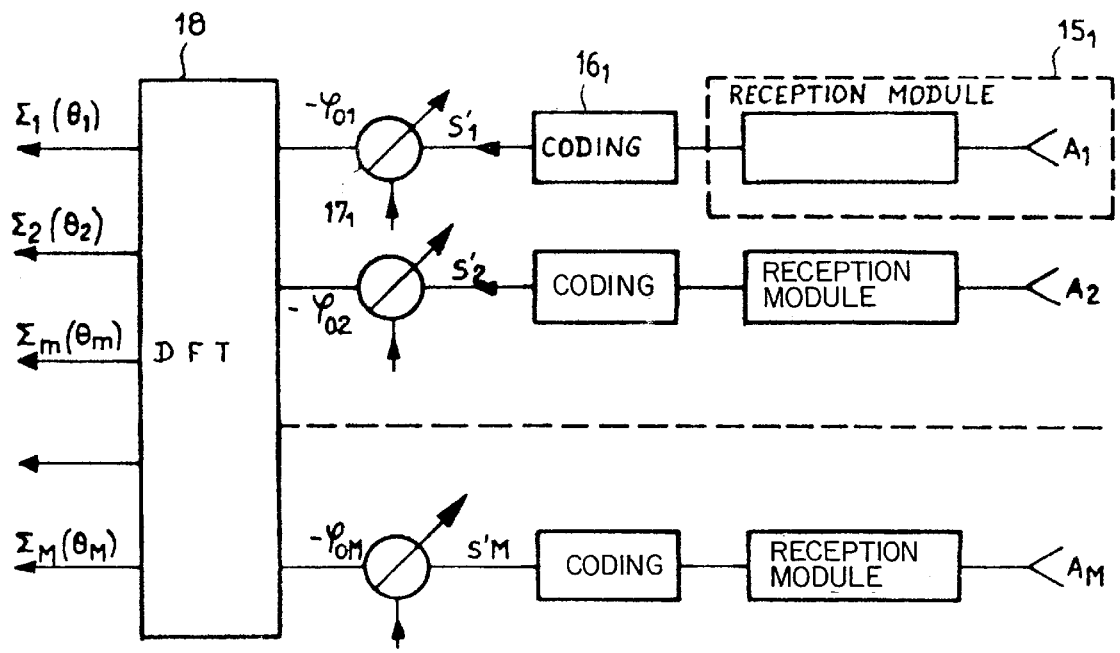

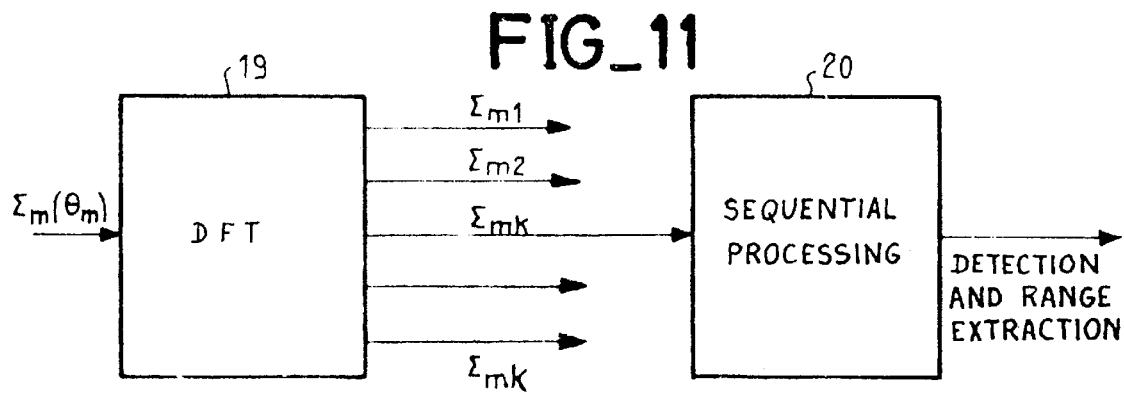
FIG_11
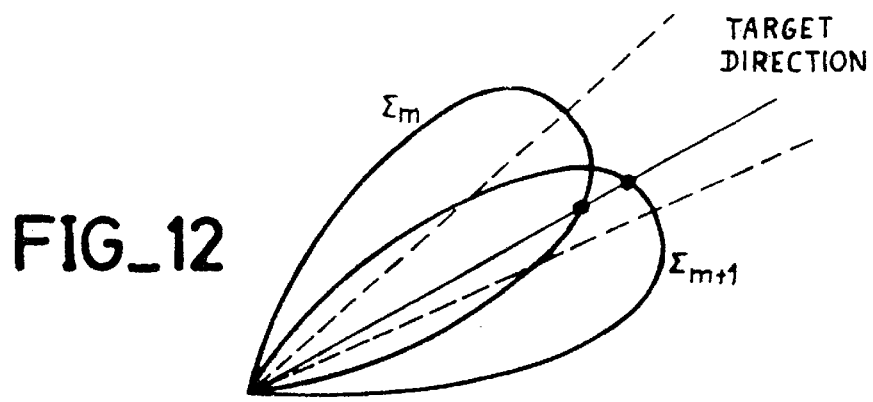
FIG_12
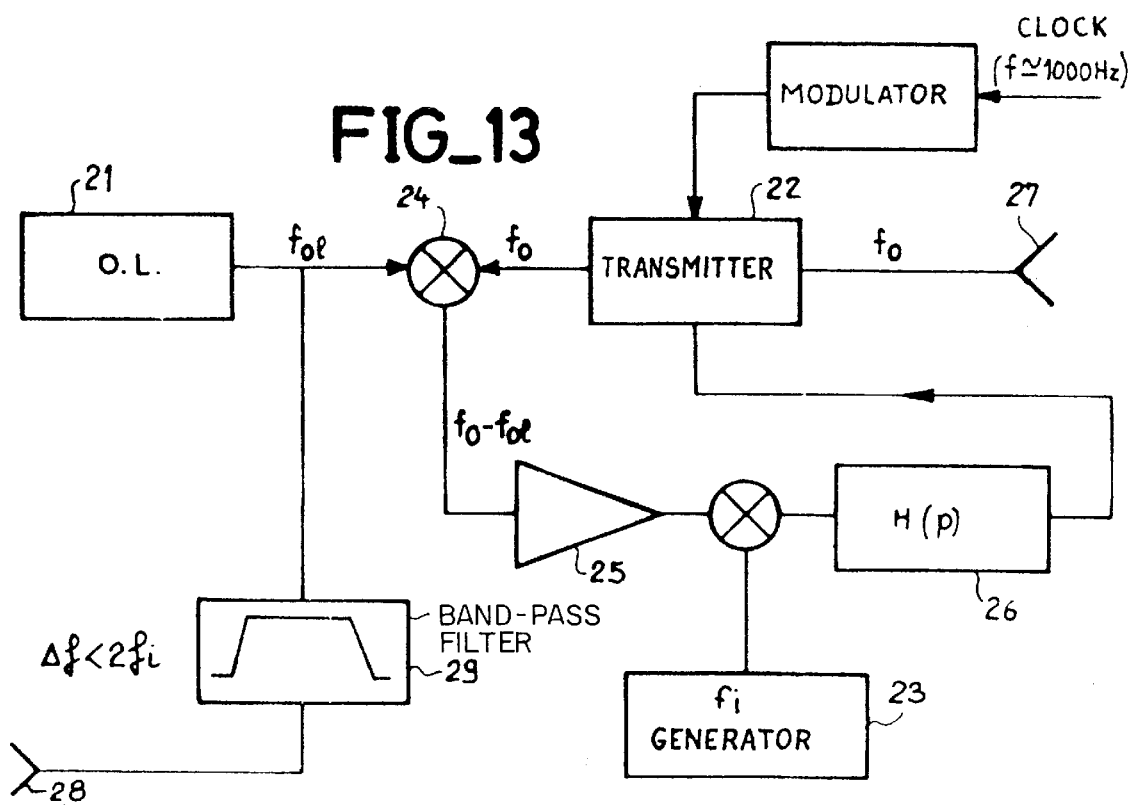
FIG_13

FIG_14
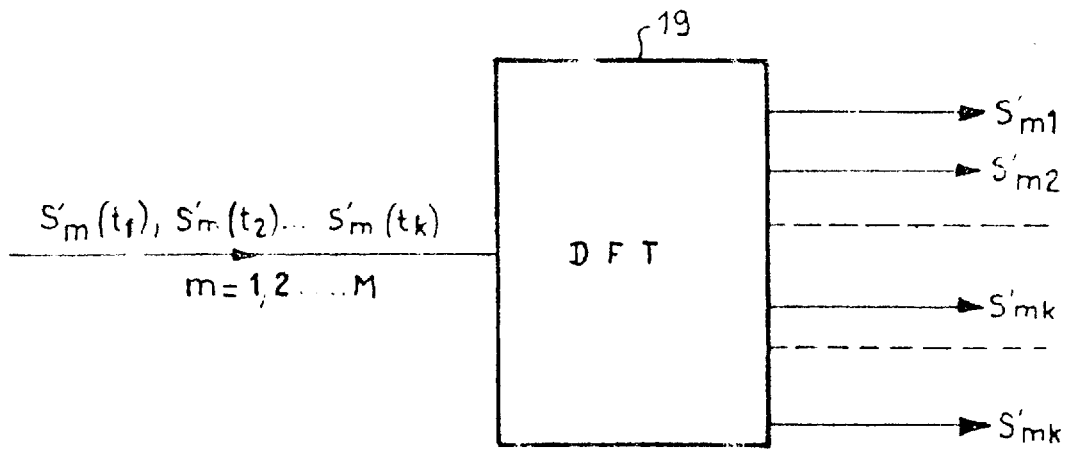
FIG_15
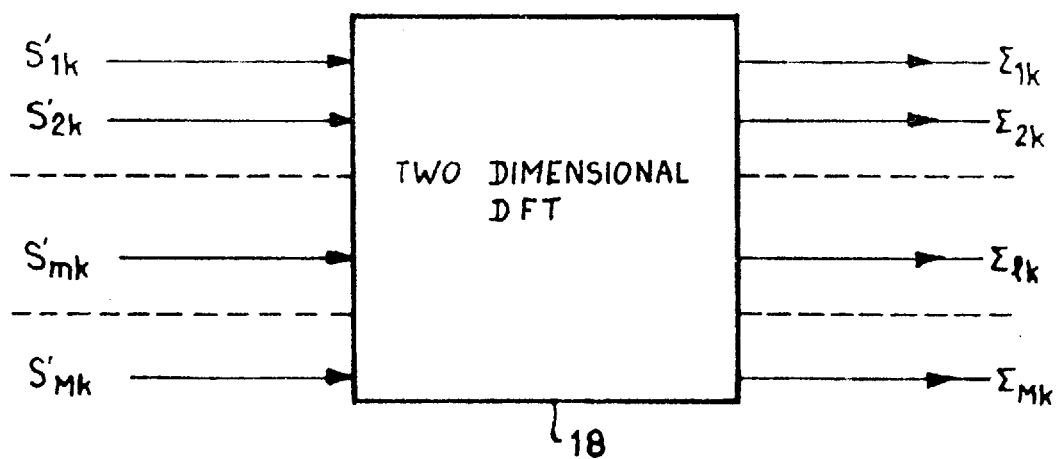
$k = 1, 2 \ldots K$
(KM VELOCITY-DIRECTION CELLS)

FIG_16
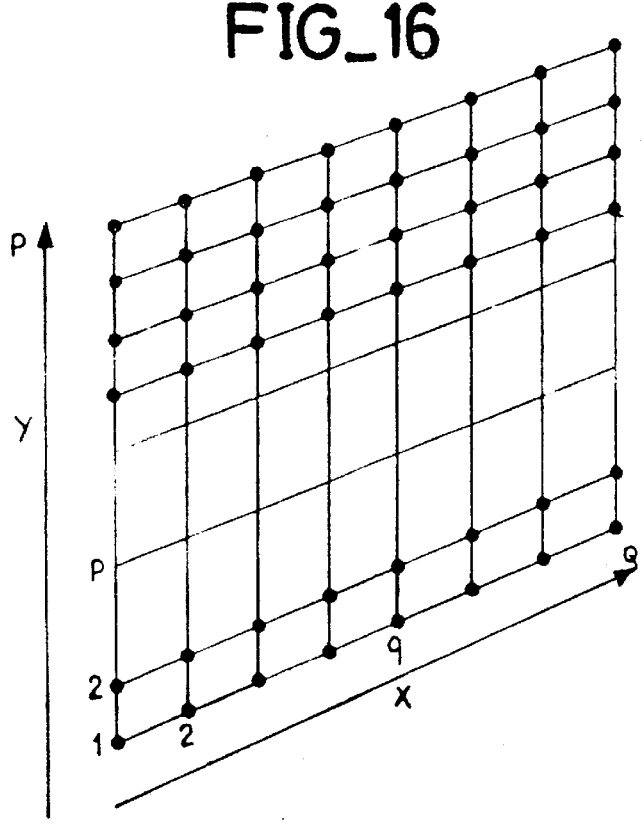
FIG_17
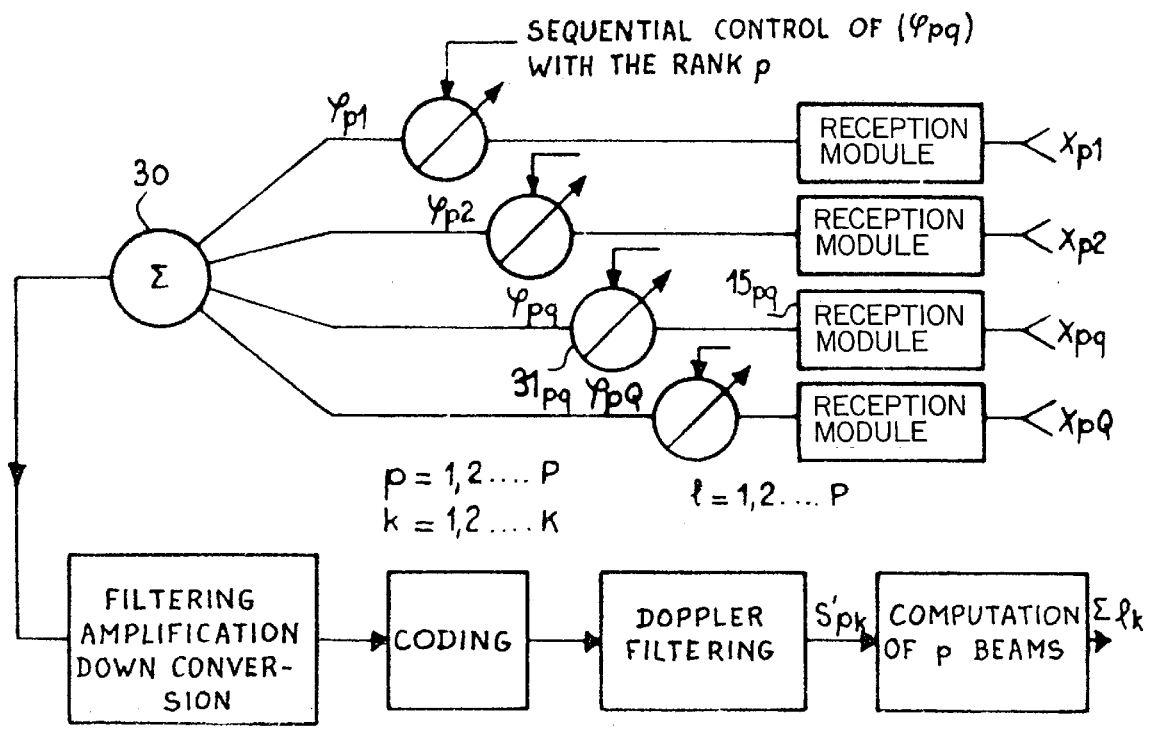

RADAR WITH A WIDE INSTANTANEOUS ANGULAR FIELD AND A HIGH INSTANTANEOUS ANGULAR RESOLUTION IN PARTICULAR FOR A MISSILE HOMING HEAD

This is a continuation of application Ser. No. 07/094,254, filed on Aug. 25, 1987, which was abandoned upon the filing hereof.

BACKGROUND OF THE INVENTION

1. Field of the Invention

The present invention relates to a radar with a wide instantaneous angular field and a high instantaneous angular resolution. It applies in particular to an architecture for a radar for a missile homing head (also called "seeker") exhibiting a number of advantages compared to the known solutions, which translates, in the operational respect, into a greater efficiency for a given size. The applications field extends to all types of missiles, usually categorized according to the type of the launch platform in question (ground, shipboard, airplane or helicopter). Depending on the type of target, all or part of the proposed architecture will be implemented.

There is described more particularly the case of a missile launched against a high-velocity aerial target (hostile aircraft or missile) flying at very low altitude over the ground or the sea. This is a very important case from the operational point of view and involves the most sophisticated radar techniques.

The proposed architecture is also applicable to certain types of radars (ground-based or airborne radars) that can have a relatively short range but require a wide instantaneous angular field while maintaining a sufficient angular resolution. For example:

an helicopter millimeter radar for navigation close to ground and surveillance of the environment;

terrain-following radar for penetration aircraft with simultaneous surveillance of airspace for self-protection purposes.

It is known that, from the point of view of the (guidance mode, the missile homing heads are divided into two main categories:

A. Semi-active homing heads, in which the radar in the missile operates only in the reception mode. It processes the echoes received from the target, the latter being illuminated by the wave transmitted by an illuminator located on the launch platform.

In general, the missile needs to know the illuminating wave transmitted to it thanks to an auxiliary antenna located at the rear of the missile and that receives directly the illuminating wave, and in addition, some additional information intended to facilitate the acquisition of the target by the homing head. In most cases, the overall energy budget is sufficient for the homing head to "acquire" the designated target before being launched, when the missile-to-target range is relatively great.

B. Active homing heads, in which the radar in the missile operates in the normal radar mode of transmission and reception. In this case, the energy budget is highly decreased due to the limited available space (in particular, low transmitted power and small antenna diameter). In general, the range of the homing head is very shorter than the missile-to-target range at the time of launching. Hence, the missile will have to acquire the target during its flight.

Also here, the transmission of information through an auxiliary channel will facilitate the task of the homing head.

The first flight phase of the missile, the so-called preguidance phase, must consequently use other means such as inertial navigation, which is autonomous, or a remote-control device on ground using, for example, the relative position information of the missile and the target measured by the radar of the weapon system.

Modern weapon systems must be capable of processing a great number of targets simultaneously. The radar of a ground-based weapon system, for example, must simultaneously ensure the search (also called surveillance) in a wide angular field, identify hostile targets and derive their kinematic parameters. The time allocated to illumination of each target is therefore very short (a few tens of a millisecond) and the rate of renewal of the information is also short (of the order of the second). Furthermore, several missiles may be launched simultaneously at various targets (or possibly at the same target) and are consequently flying at the same time.

Under these conditions, semi-active guidance is impractical due to its constraints: in order to ensure a sufficient precision of guidance, the target and the missile must be illuminated permanently (or at least in the terminal guidance phase), which is incompatible with a multi-target weapon system of reasonable complexity.

That is the reason why all multi-target modern weapon systems employ active missile homing heads that are the only seekers allowing autonomous guidance in the terminal phase. The preguidance is then relatively not precise and must do with discontinous information and/or a low-cost inertial reference unit aboard the missile.

The overall weapon system (launch platform and missiles) must obviously be optimized in terms of cost effectiveness. A tradeoff must be found between the complexity of the launch system and that of the missile.

For example, for a ground-based weapon system:

the ground radar can be relatively simple, or more performing in its own search function, if its constraints associated with the missile are loose (information sent to the missile at a low and not precise rate), but in this case, the missile must take into account the inevitable inaccuracy on the position and velocity of the target, which implies a relatively long search phase before acquisition of the target. The necessary intrinsic range becomes therefore long, due to the high missile-target relative velocities involved. The complexity of processing is also maximum and it is finally the overall size and the cost of the missile that are affected;

the situation is reversed if the ground system is capable of generating information of a quality such that it is capable of ensuring a sufficiently precise preguidance and of eliminating the search phase of the target by the missile.

The proposed architecture is intended to substantially improve this tradeoff by resolving certain incompatibilities of principle associated with the conventional technical solutions.

2. Description of the Prior Art

The conventional solution for the homing head of a missile for aerial targets flying at any altitude consists in using a Doppler radar with a high pulse repetition frequency (high-PRF), without velocity ambiguity for the fastest expected targets, but with a great ambiguity in range. The radar is located in the nose cone of the missile.

The transmitted wave (see FIG. 1) is a train of coherent pulses with a width $\tau$ and a pulse repetition frequency $f_r = 1/T_r$.

The transmitter, operating in general in the X or the Ku band, is equipped either with a tube power amplifier (traveling-wave tube—TWT) or a solid-state device (array of synchronized oscillator diodes or transistors).

The antenna is generally a flat-plate antenna with radiating slots, mechanically gimballed about two orthognal axes.

As an example, the following typical values can be indicated:

$\tau=1$ $\mu$s, $f_r=250$ kHz ($T_r=4$ $\mu$s),

Average transmitted power: 50 W,

Peak power output: 200 W (duty cycle: 0.25)

Transmission frequency: 14 GHz

Antenna diameter: 15 cm

Aperture of the axisymmetrical beam: ●=10°

Maximum possible angular displacement: ±60° conically.

A bank of Doppler filters, generally of digital design, is associated with each of the range gates with a width equal to the pulse duration and disposed in the reception interval $(T_r-\tau)$. In the example given, there would be three range gates (see FIG. 2). A received echo generally occupies two range gates.

The frequency distribution of the received signals associated with each range gate is similar to the conventional representation given in FIG. 3: the ground clutter echoes occupie a spectral region included between $-2$ $V_M/\lambda$ and $+2$ $V_M/\lambda$ ($V_M$: missile velocity, $\tau$: wavelength). The region centered on $(2\ V_M/\tau)\cos\alpha$ corresponds to ground clutter echoes resulting from illumination by the main lobe of the antenna ($\alpha$ is the pointing direction of the beam axis with respect to the velocity vector of the missile); the rest of the cluttered area corresponds to the illumination of the ground I)y the side-lobes and the diffuse radiation from the antenna. The radial velocity (also called "range rate") $V_r$ corresponding to the Doppler frequency $2\ V_r/$ is, in general, always situated in the non-cluttered area because only the head-on attacks are of practical interest $(V_r>V_M)$. The radar signal being sampled at the rate $f_r$, the spectral distribution is repeated with an interval $f_r$. In order for the signal from the target to remain outside the pollution due to ground clutter, it is necessary that:

$$f_r>(2/\tau)(V_r+V_M),$$

i.e., that the repetition frequency be higher than a value determined by the maximum velocity of the missile and the maximum velocity of the expected targets.

After the (possible) phase of preguidance, the operation of a homing head of the type in question consists in three successive phases: search, acquisition and tracking.

A. Search

This phase determines in great part the complexity of the radar of the missile. It begins when the missile-to-target range, estimated by other means, is such that the energy budget of the radar has become sufficiently favorable for the detection of the target to be possible with predetermined figures of probability of detection and of false alarm. Furthermore, detection is possible only if the missile is within the search envelope of the radar in the three dimensions: direction, range and radial velocity.

The architecture of the radar is such that the associated three search devices are closely related:

a) Angular search (see FIG. 4)

The beam of tie antenna scans the uncertainty region, either in conventional continuous manner or in discrete manner through successive steps of fixed direction. The most favorable case for the missile out the most penalizing for the launch platform, is that where the angular precision of target designation is sufficient to maintain at all times the beam axis in the direction of the target (to within ±½ beam width, that is ±5° in tile example given).

Conversely, a wide angular region of uncertainty increases the search time in proportion.

b) Range-velocity search

During the illumination time $T_i$ of a possible target by the antenna beam, it is necessary to search in the range and velocity domains ($T_i$ is of the order of 0.1 second).

The reception interval $T_r-\tau$ is divided into $(T_r-\tau)/\tau$ range gates. The spectral analysis of the signals sampled by each gate is performed by a Fourier transformation, generally a discrete Fourier transformation (DFT). The frequency resolution is approximately equal to $1/T_0$, $T_0$ being the time of "coherent" observation of the target (i.e., the time during which the parameters of the radar transmission are rigourously constant).

The time $T_0=NT_r$ (N: number of processed echoes) defines a filtering cycle.

Typically: $T_0=4\times10^{-3}$ seconds and $\Delta f=1/T_0=250$ Hz.

The time $T_i$ comprises a number of filtering cycles that are used:

for improving the signal-to-noise ratio through integration after detection;

for additional measurements, in particular for the resolution of ambiguity in range through changes in the radar transmission parameters (pulse repetition frequency or carrier frequency, for instance).

In addition, depending on the permissible complexity, the analysis of the domain of range-velocity uncertainty is performed either fully in parallel (as many DFT as range gates) or through a tradeoff between parallel and sequential processing: for example, the signals from the range gates are applied in succession to a single processing by DFT.

As in the case of angular search, the role of target designation is of prime importance:

The most favorable case for the missile is that where the accuracy of designation is such that it allows, through computation of the pulse repetition frequency, to foresee the range gate where the target will appear, or at least to avoid that the target echo coincides with the transmission times, during which the receiver is turned off (eclipse phenomenon).

Thus, in the example given, there are three range gates of 150 m each. The precision required for the missile-to-target range should be better than ±75 m in order to predict the rank of the gate, and ±225 m to avoid eclipses. Likewise, the precision of the radial velocity of the designated target influences directly the number of filtering channels to examine.

Conversely, a very inaccurate target designation requires a maximum of parallelism in the processing in order to avoid a prohibitive increase of the illumination time $T_i$ and, finally, of the overall search time.

For example, if the search domain is of ±30° (conically) and if the beam has an aperture of 10°, about 40 beams will be necessary to cover the uncertainty domain, and the overall scanning time will become 40 $T_i$ (that is 4 secondes if $T_i=0.1$ s).

B. Acquisition

The conditions of detection being satisfied, any alarm must be confirmed through the usual methods including in particular likelihood criteria such as the measurement of the non-ambiguous range and the radial velocity, observation of the punctiform character (in range) of the target, etc.).

In the case where the antenna beam scans airspace, this confirmation, obtained after a sufficient illumination time $T_j$, stops the antenna in the direction of the target and the process of tracking initialization can begin.

C. Tracking

Tracking consists in obtaining continuous and accurate measures of the direction, velocity and range of the target intended for computation of the information for the guidance of the missile. The resolution cell for ambiguous range-velocity is locked to the target. In the case of a monopulse antenna with three simultaneous channels, the two difference channels include the same processing as the sum channel and allow to derive the target-antenna axis (also called "target-boresight") angular error for locking the antenna to the target direction.

Also here, the measurement of the non-ambiguous range is necessary to avoid the phenomenon of eclipses, thanks to an appropriate switching of the repetition frequency, and also to improve the guidance law.

The disadvantages and constraints of the conventional solution are related both to the principle of the high-PRF radar and to the maximum permissible size of the missile.

With respect to the high-PRF waveform, the eclipse phenomenon causes frequent fadeouts of the received signal, except if the weapon system is capable of furnishing the missile-to-target range with a great precision and if, during the tracking phase, the signal-to-noise ratio is sufficient to allow the computation of the correct pulse repetition frequency.

The great number of range ambiguities, compounded by a wide beam width, reduces the resolution. Thus, with the typical values given above, targets spaced by 600 m, 1200 m, etc. flying at the same velocity, cannot be discriminated, which may make the weapon system fully ineffective in case of an attack by several aircraft in formation. Even if the ground radar can discriminate the targets, the missile will not be able to do so (except, possibly, at very short range) because the direction-range-velocity resolution cells are then merged.

As regards the size and cost of the missile, the precision of target designation, mainly in the angular domain, plays a basic role in the overall sizing of the homing head and consequently of the missile, but also in the operational efficiency of the weapon system.

As an example, we can consider a homing head whose characteristics correspond to the typical values given above.

Let us assume that the required range of the missile is 6 km for a certain target, under the most favorable conditions of target designation and that the relative velocity missile-target is 1500 m/s ($V_M$=750 m/s, $V_C$=750 m/s).

If the homing head was to search in a conical domain of ±30°, during a time that could attain 4 seconds, its range should be increased by 4×1500 m=6000 meters.

All things being equal, this doubling of the range would have to be obtained through multiplication by 16 of the transmitted power (that is 16×50 W=800 W, which is unrealistic for a small-sized missile.

In addition:

the maximum range at which the hostile target could detect the transmission from the missile and hence jam it, with noise, chaff or deception jamming, would increase much faster than the range of the homing head (it would be multiplied by 4 in the given example);

the lower limit of the domain of efficiency of the weapons system would be increased by the necessary increase of the missile range, which would make the weapon system ineffective for certain targets flying at very low altitude and popping up at the last time.

It should be noted that the use of a phased-array antenna of the conventional type would eliminate the problems associated with the inertia of the antenna, out would not fundamentally change the situation in case of not precise angular target designation since scanning of airspace could still be performed sequentially. Such an approach, in its most modern form (an array of active transmission-reception modules distributed over the radiating surface) would besides imply a very high cost.

That is the reason why it is preferred, in general, to have the complexity in the launching system rather than in the missile. In addition, it can be noted that this approach suffers from serious operational deficiencies in a hostile environment:

the ground-to-missile link for the transmission of information for target designation can be disrupted by an enemy jammer (also the possible missile-to-ground link);

the radar itself can he jammed, which may cause the loss of certain information or a degradation of its quality.

SUMMARY OF THE INVENTION

The present invention allows to avoid the disadvantages mentioned above.

According to the present invention, a radar with a wide instantaneous angular field and a high instantaneous angular resolution, in particular for a missile homing head, is essentially characterized in that it includes:

a transmitting antenna, with a relatively wide radiation pattern, transmitting a quasi-continuous wave;

a receiving antenna including a plurality of radiating elements;

means for formation of beams associated with the receiving antenna, to achieve a linear combination of the signals from the various radiating elements of the receiving antenna, in order to obtain a group of simultaneous reception beams allowing the instantaneous scanning of the airspace covered by the transmission beam.

BRIEF DESCRIPTION OF THE DRAWINGS

Other objects and characteristics of the present invention will become apparent from the following description of preferred embodiments, given with reference to the accompanying drawings, in addition to the already-described FIGS. 1 to 4 related to the prior art, in which:

FIG. 5 is a schematic of the general architecture of a radar according to the present invention;

FIG. 6 shows the waveform employed in a radar according to the present invention;

FIG. 7 is a diagram illustrating the temporal discrete Fourier transformation operation performed in a radar according to the present invention;

FIG. 8 is a schematic of the receiver module associated with each of the radiating elements of the receiving antenna;

FIG. 9 shows the spectral distribution of the received signals;

FIG. 10 shows a first portion of the processing carried out in the reception mode;

FIG. 11 shows a second portion of the processing carried out in the reception mode;

FIG. 12 is a diagram illustrating the enhancement of the precision of the angular measurements;

FIG. 13 is a block diagram of the transmitter;

FIG. 14 is a schematic showing the input and output samples of the "temporal DFT" operator in the case where this operator is followed by the "spatial DFT" operator;

FIG. 15 is a schematic showing the input and output samples of the "spatial DFT" operator in the same case as in FIG. 14;

FIG. 16 shows an arrangement of the radiating elements of the receiving antenna;

FIG. 17 shows the processing performed in the reception mode when the receiving antenna is an antenna with simultaneous beams along a dimension and sequential electronic scanning along another dimension.

DESCRIPTION OF A PREFERRED EMBODIMENT

The general architecture of a radar according to the present invention such as that shown in FIG. 5 is essentially based on the following features:

the transmitting and receiving antennas are physically separated and fixed inside the missile. No mechanical movement is necessary for scanning airspace.

The transmitting antenna, of very small size, is located at the forward end of the radome and has a wide radiation pattern (for example, ±45°).

The receiving antenna, whose plane surface is substantially equal to the cross section of the missile, is made up of independent and identical reception modules. The output signals from the modules, preferably with a zero carrier frequency, are linearly combined in order to obtain, through computation, a group of simultaneous and adjacent reception beams; these allow the instantaneous scanning of all the airspace covered by the transmission beam, by means of parallel channels. The linear operator used for the computation can, for example, perform a discrete Fourier transformation (DFT) from the samples constituted by the output signals of the modules in order to obtain a group of orthogonal beams;

the transmission and reception functions are simultaneous.

The decoupling between the transmitting antenna and each of the radiating elements of the modules is sufficient to avoid the saturation of the first reception stage through leakage of the transmitted signal (microwave mixer and first intermediate-frequency amplifier stage). An automatic compensation device, operating at intermediate frequency, allows, in each module, to eliminate the major part of the transmission leakage before the amplifier and processing stages in order to allow them to operate within a reasonable dynamic range;

the transmitted waveform is continuous.

The elimination of the transmit/receive switching allows the use of waveforms that are not achievable with conventional radars, and in particular simpler waveform from which the ambiguity characteristics related to the sampling of the signal have disappeared;

the reception modules are simple.

They do not include any physical microwave link with the local oscillator (LO): the local oscillator feeds an antenna of very small size located at the back of the transmission antenna; this antenna illuminates all of the modules.

The radiating element of each module collects then both the received radar echo and the frequency reference from the local oscillator. The mixer uses a single diode;

the proposed architecture allows the operation in the semi-active mode during the preguidance phase.

There is now described in a more detailed way the principle of operation of a radar according to the present invention.

The transmitted wave consists of successive elemental waves, regularly spaced and with constant amplitude as shown in FIG. 6.

The duration of each elemental wave, also called "filtering cycle", is T. The period is $T_e$.

The transmitted frequency is constant and stable during the duration of each filtering cycle, but may vary from a cycle to the next one.

The collection of N successive filtering cycles ($C_1$, $C_2$, . . . , $C_N$) constitutes a "sequence" from which there will be extracted additional information, more or less elaborate, through processing of the primary information derived from each cycle.

The N cycles, numbered 1 to N as a function of time, are associated with the corresponding frequencies $f_1, f_2, \ldots, f_N$.

We can have the three following cases:

Type-A sequence: $f_1=f_2, \ldots, f_N$.

The transmitted frequency remains constant and stable. The successive cycles are coherent to each other and result from chopping a single reference wave.

Type-B sequence: $f_1 \neq f_2, \ldots, f_N$.

This is the "frequency agility" mode. All of the cycles have different frequencies distributed in a wide range $\Delta F$ (for example, $\Delta F$ extends from 10 to 300 MHz). There is no coherence between the cycles.

Type-C sequence:

The frequencies are regularly spaced by $\delta f$:

$$f_n = f_{n-1} + \delta f$$

where $\delta f$ is relatively small; the N cycles are coherent with each other, i.e., the phase relationships between the cycle beginnings are known and used.

For example: 20 kHz < $\delta f$ < 100 kHz

N=16

F=(N−1) $\delta f$ =(320 kHz to 1.6 MHz).

There is now described the processing associated with the transmitted wave.

A. Processing associated with each elemental filtering cycle

If we denote by $\tau_0$ the delay of the received signal, measured at the beginning of the signal corresponding to the first transmitted cycle, and by $a = d\tau/dt$ the slope of the variation of the delay proportional to the radial velocity $V_r$ of the target, the phase of the received signal $s_1$ corresponding to the cycle $C_1$ is:

$$\phi_1 = -\omega_1 \tau_0 - \omega_1 a t'_1 \quad (\omega_1 = 2\pi f_1)$$

where $\phi_1$ is measured with respect to the phase of the transmitted signal: $\phi_e = \omega_1 t$;

and $t'_1 = t - \tau_0$ is the time measured from the instant of the beginning of the received signal.

The term $\omega_1 a = 2\pi f_1 (d\tau/dt)$ represents the Dopler shift ($f_{d1} = f_1 (d\tau/dt)$).

In a similar way, to the cycle of rank n corresponds a received signal $s_n$ with a phase:

$$\phi_n = -\omega_n [\tau_0 + (n-1)\delta\tau_0] - \omega a t'_n \quad (1)$$

where $\delta\tau_0$ is the variation of the delay between two successive cycles, with the radial velocity assumed constant, and $t'_n$ is the time elapsed from the beginning of the signal of rank n.

The received signal $s_n$, after synchronous detection with the transmitted signal, is therefore a continuous sine wave with a duration T, beginning at the, a priori unknown, time;

$$\tau_{0n} = \tau_0 + (n-1)\delta\tau_0,$$

with an initial phase $-\omega_n \tau_{0n}$ and a frequency $a\omega n/2\pi = f_{dn}$, also unknown a priori.

The signal is extracted by means of a bank of filters constituted by a discrete Fourier transformation that samples the signal at a rate sufficient to avoid any ambiguity in the interval of the expected Doppler frequencies. If, for example, this interval is included between 0 and 100 kHz, the sampling period should not be longer than 10 $\mu$s.

In order to avoid pollution between filters, it is necessary to weight symmetrically the received signal. Its time of arrival being unknown, we define arbitrarily a signal with a duration $T'=T-\tau_{OM}$ beginning at $\tau_{OM}$ and ending at T, with respect to the beginning of the transmitted signal. Reference is made for that to FIG. 7.

The term $\tau_{OM}$ denotes a fixed delay corresponding to the estimated maximum delay for the received signals (for example $\tau_0$=100 $\mu$s. Thus, whatever the delay between 0 and $\tau_{OM}$, the signal applied to the DFT operator can be weighted symmetrically in amplitude over the duration $T-\tau_{OM}$ at the price of a moderate reduction of the duration of the signal, if $\tau_{OM} <<T$. By putting as new time reference the middle instant of this new signal, the expression (1) becomes:

$$\phi_n = -\omega_n[\tau_0 + (n-1)\delta\tau_0] - \omega_n a[t''_n + ((T-\tau_{OM})/2)]$$

with $t''_n = t'_n - [(T-\tau_{OM})/2]$
and $$\phi_n = -\omega_n[\tau_0 + (n-1)\delta\tau_0 + a((T-\tau_{OM})/2)] - \omega_n a t''_n \quad (2)$$

The DFT operator eliminates the term $-\omega_n a t''_n$ even if the signal is not exactly centered in frequency in the filter, provided the computation algorithm acts symmetrically on the input samples distributed symmetrically about the time $t''_n = 0$.

The filtered output signal resulting from the discrete Fourier transformation has therefore the phase:

$$\phi_{0n} = -\omega_n[\tau_0 + (a/2)(T-\tau_{OM})] - \omega_n(n-1)\delta\tau_0 \quad (3)$$

Hence the rank of the output filter defines without ambiguity the Doppler shift of the target.

B. Noncoherent processing over the N cycles of a sequence
Only the amplitudes $|S_n|$ are used.

The integration of the N amplitudes allows to improve the signal-to-noise ratio.

In addition, the frequency agility mode (type-B sequences) allows to improve the detection fo the fluctuating targets and to enhance the jamming resistance of the homing head in presence of noise jammers.

C. Coherent processing over the N cycles of a sequence
a) Sequences with constant frequency (type A)
The phase of the signal $S_n$ (expression (3)) becomes:

$$\phi_{0n} = -\omega_1[\tau_0 + a/2(t-\epsilon_{OM})] - \omega_1(n-1)aT_e$$

where $aT_e = \delta_0$ $$\phi_n = \phi'_0 - (n-1)\,2\pi f_d T_e \quad (4)$$

$\phi'_0$: constant for a given radial velocity
$f_d$: Doppler shift of the target
$T_e$: period of the successive cycles making up the sequence ($T_e$ is very little greater than T).

The phase difference between two successive signals being constant, a DFT operator applied to the N signals allows to improve:
  the signal-to-noise ratio by the factor N;
  and the velocity resolution in a ratio of the order of N: the bandwidth of the filters implemented by the DFT is about $1/NT_e = 1/NT$; the frequency measurements are not ambiguous in a frequency interval equal to $1/T_e$ ( =1/T) that covers approximately the bandwidth of the Doppler filter of the elemental cycles.

b) Sequences with the successive cycles regularly spaced in frequency.

This mode of operation allows the measurement of the target range (in addition to their velocity). This is a linear processing that, in opposition to the conventional methods of ambiguity resolution, has a range. resolution usable when several targets with the same velocity are detected simultaneously in the range interval of the radar.

This processing requires the use of information obtained from two successive sequences
  a N° 1 sequence with a constant frequency $f_1$;
  a N° 2 sequence with frequency cycles regularly spaced by $\delta\omega = 2\pi\delta f$.

The velocity of the target is assumed to be constant during the overall duration of these two sequences.

We put: $\tau'_0 = \tau_{0=a}/2 \,(T-\tau_{OM})$.

For a given radial velocity, the term $a/2 \,(T-\tau_{OM})$ is a constant and $\delta\tau'_0 = \delta\tau_0$.

The phase of the N° 1 sequence is:

$$\phi_{0n1} = -\omega_1 \tau'_{01} - (n-1)\omega_1 \delta\tau_0 \,(n=1,2,\ldots,N) \quad (5)$$

The phase of N° 2 sequence is:

$$\phi_{0n2} = -[\omega_1 + (n-1)\delta\omega]\tau'_{02} - [\omega_1 + (n-1)\delta\omega](n-1)\delta\tau_0$$

$$\phi_{0n2} = -\omega_1 \tau'_{02} - (n-1)[\delta\omega\tau'_{02} + \omega_1\delta\tau_0] - (n-1)^2 \delta\omega\tau_0$$

where:
  $\tau'_{01}$: delay of the signal (to within a constant) at the time of the beginning of the first cycle of N° 1 sequence;
  $\tau'_{02}$: delay of the signal (to within the same constant) at the time of the beginning of the first cycle of N° 2 sequence.

We shall assume, for the time being, that the term $(n-1)^2 \delta\omega\tau_0$ is negligible.

The DFT operator applied to the N signals of the N° 1 sequence allows to measure $\omega_1\delta\tau_0$ to within about $\pm\pi/N$. This measurement is not ambiguous (see paragraph a) above).

This same operator, when applied to the N° 2 sequence, allows to measure the quantity $(\delta\omega\tau'_{02} + \omega_1\delta\tau_0)$, also to within $\pm\pi/N$. The preliminary knowledge of the term Cal $\omega_1\delta\tau_0$ allows therefore to compute the term $\delta\omega\tau'_{02}$, hence the delay $\tau'_{02}$.

The non-ambiguous interval for $\tau'_{02}$ is $\tau'_{02M} = 1/\delta f$. Furthermore, it should be noted that the component $a/2(T-\tau_{OM})$ is negligible compared to $1/\delta f$ for all practical cases, and we shall assume:

$$\delta\omega\tau'_{02} = \delta\omega\tau_{02}.$$

(For example, if $V_r$=1500 m/s, $T=10^{-3}$s, $\tau_{OM}$=50 us, we get $a/2(T-\tau_{OM})=0.5\times10^{-2}$ $\mu$s, which corresponds to a range error lower than 1 meter).

EXAMPLES

1. If $\delta f$=20 kHz and N=16, the non-ambiguous range interval is 7.5 km and the range resolution is 7500/16=470 m.
2. If $\delta f$=100 kHz and N=16, the non-ambiguous interval becomes 1.5 km and the resolution about 90 meters.
3. If $\delta f$=200 kHz and N=32, the non-ambiguous interval is 750 m and the resolution 750/32=23 m.

Notes: 1. The origin phases $-\omega_1\tau'_{01}$ and $-\omega\tau'_{02}$ of the two sequences are not used and have no influence on the results.

2. If the term $(n-1)^2\delta\omega\tau_0$ is not negligible, it must be compensated for before applying the samples to the DFT operator. It can be computed with a sufficient approximation thanks to the knowledge of the Doppler shift obtained from the processing of each elemental cycle.

D. Coherent processing over a small number of successive cycles

The use of the phase relationships between a small number of successive cycles allows to extract the range of a target, but without benefiting of any range resolution.

EXAMPLE 1

We consider a short sequence made up of three successive cycles $C_1$, $C_2$, $C_3$: $C_1$ and $C_2$ have the same frequency $f_1$; the frequency of $C_3$ is $f_1+\delta f$.

The previously derived formulas give the expression of the phases of the corresponding processed signals:

$$\phi_1 = -\omega_1 \tau'_0$$

$$\phi_2 = -\omega_1 \tau'_0 - \omega_1 \delta\tau_0$$

$$\phi_3 = -\omega_1 \tau'_0 - (\delta\omega\tau'_0 + 2\delta\tau_0\omega_1)$$

(when disregarding the term $2\delta\tau_0\delta\omega$).

We can readily derive:

$$\phi_2 - \phi_1 = -\omega_1 \delta\tau_0 = -2\pi f_d T_e$$

$$\phi_3 - \phi_2 = -(\delta\omega\tau'_0 + \omega_1\delta\tau_0).$$

The measurement of $(\phi_2-\phi_1)$ and $(\phi_3-\phi_2)$ allows therefore the computation of $\delta\omega\tau'_0$ and hence the determination of $\tau'_0$.

The measurement of $\tau'_0 = \tau_0$ can be made more precise by using the measures from a few short sequences of this type. It should be noted that the successive short sequences can be transmitted at very different carrier frequencies, thus allowing the operation with frequency agility at a rate of three elemental cycles.

EXAMPLES 2

We shall consider a pair of successive cycles $C_1$ and $C_2$. The wave of the cycle $C_1$ is made up of two signals with the same amplitude and simultaneous, with frequencies $f_1$ and $f_2$ spaced by a difference $\Delta f$ (of about 1 MHz to a few tens of MHz)

Two processing channels, parallel, identical and simultaneous, allow to measure, for each cycle, the phase difference between the simultaneous output signals:

for $C_1$: $\Delta\phi_1 = 2\pi\Delta f \tau'_{01}$.

Cycle $C_2$ is constituted in the same manner with with a frequency $f'_2$ slightly different from $f_2$ ($f'_2 = f_2 + \delta f$).

$C_2$:

$$\Delta\phi_2 = 2\pi(\Delta f + \delta f)(\tau'_{01} + \delta\tau_0).$$

and $$\Delta\phi_2 - \Delta\phi_1 = 2\pi(\Delta f \tau'_{01} + \Delta f \delta\tau_0).$$

Disregarding the term $2\pi\delta f\delta\tau_0$, we get:

$$\Delta\phi_2 - \Delta\phi_1 = 2\pi(\delta f \tau'_{01} + \Delta f \delta\tau_0).$$

The term $\Delta f \delta\tau_0$ is known with a good approximation thanks to the knowledge of the Doppler shift. The measurement of $\Delta\phi_2 - \Delta\phi_1$ allows therefore the computation of $2\pi\delta f \tau'_{01}$, hence the computation of the target range.

Also here, the radar can operate with frequency agility every two cycles (every two milliseconds in the given example), each cycle being itself "two-frequency".

E. Utilization of the various types of processing

The utilization of all or part of these more or less complex types of processing depends on the environment and in particular on the number of targets to handle and the enemy countermeasures.

For example, if there is no more than one target per reception beam and per velocity resolution cell, the measurement of the target range can be carried out by means of short sequences (2 or 3 elemental cycles) frequency-agile from a sequence to the next one.

In the case where, in one or several reception beams, there are several targets with the same velocity, it is necessary to use sequences with cycles regularly shifted in frequency to be able to discriminate the targets in range. Several groups of two sequences may he necessary to obtain range measurements more and more precise and [00e6]an increased resolution (at the expense of the ambiguity domain). This operating mode, which is more complex, will preferably be applied to the targets whose direction and velocity have been previously measured.

There will now be described the architecture of the reception modules.

The overall receiving antenna is made up of M modules, all identical and independent. The basic architecture of the module "m" (m=1, 2, . . . , M) is shown schematically in FIG. 8.

A radiating element 1 m, of small size, constitutes the elemental receiving antenna, with a very wide radiation pattern (and a gain of about 6 to 10 dB). This antenna receives:

- the radar signals with a frequency $f_s = f_0 + f_d$ ($f_d$: Doppler shift of all the signals received from the environment useful echoes and ground clutter echoes);
- the local oscillator reference at a frequency $f_{ol} = f_0 - f_i$. ($f_i$: intermediate frequency);
- the spurious signal at a frequency $f_0$ coming from the spurious radiation of the transmitting antenna (backward radiation).

All these microwave signals are applied to a mixer diode 2 m (or possibly to a bank of several diodes in parallel) that constitutes a non-balanced mixer.

The intermediate-frequency output signal at a frequency $f_i = f_0 - f_{ol}$ or $f_1 + f_d$ (depending on whether it is the transmission leakage signal or radar signals proper) is applied to a low-gain preamplifier 3 in associated with a filter 4 m with a relatively narrow bandwidth. (For example, $f_{0=10}$ GHz, $f_1 = 50$ MHz, $f_i = 1$ MHz).

The spectral distribution of the received signals is shown in FIG. 9.

It will be noted that the peak of the main, lobe, usual in this type of representation does not exist here due to the quasi-omnidirectional character of the radiation pattern of each nodule. On the other hand, the peak at the frequency $f_i$, due to the transmission leakage, is very high compared to the level of the expected targets. It must not exceed a level beyond which saturation of the mixer and the associated preamplifier would cause intermodulations between this signal and the high-level ground clutter echoes.

The collection of signals covers an interval extending from $-2 V_M/\lambda$ to $2 V_{r\,max}/\lambda$ ($V_M$: missile velocity, $V_{r\,max}$: maximum velocity of the desired targets, $\lambda$: wavelength).

As an example, if $\lambda = 3$ cm ($f_{0=10}$ GHz), $V_{r\,max} = 1500$ m/s and $V_M = 750$ m/s, the spectral interval extends from $f_i - 50$ kHz to $f_i + 100$ kHz.

The useful interval, corresponding to head-on targets, extends from $+2 V_M$ to $+2 V_{r\,max}$, that is from $f_i + 50$ kHz to $f_i + 100$ kHz in[00c6] the given example.

This interval must be selected the most possible upstream in the reception system in order to avoid the non-linearities in the various amplifier or mixer stages. The elimination of the ground clutter echoes and the transmission leakage by filtering can be achieved in various manners. It is possible to envisage, as an example, a filtering in three successive steps:
a) a compensation signal with a frequency $f_i$, obtained from the down-conversion, by the signal of a local oscillator with a frequency $f_{ol}$, of a low-level sample of the transmitted signal at a frequency $f_0$ tapped from the transmitter, is applied in phase opposition with the transmission leakage signal at the preamplifier. This compensation signal is applied after an adjustment of its amplitude A mid its phase $\phi_m$ by means of two adjusting controls 6 m and 7 m, respectively. These two parameters are characteristic of the module with the rank m and they are in principle fixed (or at most slowly variable in practice due to aging or temperature effects) because the geometry of [00e6]the transmission-reception assembly is rigid.

The efficiency of the compensation is relatively low, for example between 20 dB and 40 dB.

Note Due to the short paths involved (whose differences can be compensated for if necessary), the frequency noise associated with the central lines of the reference oscillators (transmitter, local oscillator, intermediate-frequency reference) are very closely correlated; the compensation obtained at the reference frequency $f_i$ is therefore valid in a very large spectral interval (at least 10 MHz, for instance). The elimination of the spurious leakage frequency line at a frequency $f_i$ leads therefore automatically to the elimination of the associated frequency noise in all the useful interval, with the same level of compensation.

The same is true for the amplitude noise of the transmitter.
b) this partial compensation stage is followed by a frequency converter stage 8 in order to bring the signals down to a relatively low[00c6] carrier frequency (a few megahertz) permitting an easy implementation of a bandpass filter selecting the frequency interval ($f_i+2$ $V_{M/\lambda, fi}+2$ $V_{r\ max}/\lambda$).

The signals in the useful interval are then amplified at intermediate frequency by means of an amplifier 10 m with a gain compatible with the level of spurious signal remaining after the two previous steps.
c). two synchronous detectors in quadrature such as 12 m fed with a reference frequency $f'_i$ equal to $f_1-f_{i1}$ (where $f_i$ is supplied by a generator 11 m) equally obtained by tapping a sample from the transmitted wave, supplying the signals with zero carrier frequency, in the form of two video components $X_M$ and $Y_m$. The residual leakage signal (and its associated frequency noise) is again highly attenuated.

After this third filtering step, the video signals included in the useful interval are amplified and routed to the processing circuitry whose first phase is an analog-to-digital conversion. After the formation of the beams through computation, as the DFT processing constitutes a bank of narrow-band filters, it will perform a fourth filtering step.

There is now described the formation of the reception beams; reference is made for that to FIG. 10.

The output signals $s'_1, s'_2, \ldots, s'_m$ of the reception modules 15 m obtained in digital form, after passing through an analog-to-digital converter 16 m, have a priori undetermined but stable relative phases. These differential phases are due to the difference in electrical path between the M local oscillator waves, to the unavoidable differences in the construction of the modules, both at microwave and intermediate-frequency levels, to the imperfections of assembly of the modules, etc. It is necessary to correct these deviations before the formation of the reception beams.

A simple means consists, for example, in applying to the whole antenna a plane wave, at a frequency $f_0+f_d$ chosen in the useful interval, whose propagation direction is normal to tha antenna plane. The measured phases $\phi_{01}, \phi_{02}, \ldots, \phi_{0M}$ (with respect to an arbitrary reference and, for example, the phase of one of the modules) must all be identical. It is therefore sufficient to apply the opposite phases $-\phi_{01}, -\phi_{02}, \ldots, -\phi_{0M}$ to the signals $s'_1, s'_2, \ldots, s'_M$ (to within an arbitrary constant) by means of phase-shifters 17 in. These corrections, fixed in principle, can be adjusted through the same method in order to compensate for the possible long-term changes.

The signals $s_1, s_2, \ldots, s_M$ obtained after correction of the origin phases of the modules are applied to a processing circuitry for forming the beams. The most classical case consists in forming M beams by performing a discrete Fourier transformation (DFT) from the M input signals.

All or part of these beams will be used by the radar. The output signals $\Sigma_1, \Sigma_2, \ldots, \Sigma_M$ correspond to the targets located in the directions $\theta_1, \theta_2, \ldots, \theta_M$, respectively.

What regards the detection and the measurement of the parameters during the search phase, to each channel $\Sigma_m$ of the angular interval of interest is associated a bank 19 of Doppler filter $\Sigma_{m1}, \Sigma_{m2}, \ldots, \Sigma_{mk}$ that allows the selection of the targets in the direction $\theta_m$ and the measurement of their radial velocity. (Reference is made for that to FIG. 11).

A more or less complex processing 20 of the successive signals allows then the measurement of the range.

Conventional devices with controlled threshold allow to designate, each channel $\Sigma_{mk}$ that includes a desired target.

The interval including the designated targets is thus examined instantaneously (or quasi[00f9]instantaneously if the range is measured).

The angular measurement can be made more precise through interpolation by turning to account the existence of adjacent beams:
  either in case of detection in two adjacent beams (see FIG. 12): $\Sigma_m$ and $\Sigma_{m+1}$, if the amplitude responses are similar;
  or within a beam $\Sigma_m$ by forming a second group of beams $\Sigma'_m$ angularly shifted from the first one by a half-width of an elemental beam (by a linear combination of the type ½ $(\Sigma_m+\Sigma_{m+1})$, for instance).

In the case of several targets, the selection of one of them is made according to a pre[00f9]established operational criterion involving the measured parameters (directions, distances, velocities). Velocity tracking and (possibly) range tracking are performed by conventional methods. Angular tracking can be performed by using monopulse methods:
  either by using fixed beams (tied to the geometry of the missile) and carrying out the operation:

$$\Delta\theta = K[(\Sigma_m - \Sigma_{m+1})/(\Sigma_m + \Sigma_{m+1})]$$

that allows a measurement of the angular deviation $\Delta\theta$ of the target with respect to the direction of intersection of two adjacent beams;
  or, more classically, by electronically locking the position of the two adjacent beams so that $\Delta\theta=0$; this locking is controlled by the introduction of a phase difference $\epsilon\phi$ between two successive modules, as a function of the position of the target; the relationship relating the locking angular error $\epsilon\theta$ to the phase error $\epsilon\phi$ is:

$$\epsilon_\theta = \epsilon_\phi/[(2\pi d/\lambda)\cos\theta]$$

where $\lambda$ is the wavelength, d the spacing between two successive radiating elements, $\theta$ the angle between the pointing direction and the normal to the antenna plane.

Note:

In the presence of jammers angularly offset with respect to the target, the conventional algorithms allow to obtain nulls in their directions by processing the N available complex signals.

Concerning the operation in semi-active mode, the proposed architecture lends easily itself to this operating mode.

The illuminator illuminates the target with a wave of the same type as that of the transmitter of the homing head, i.e., a sequence of identical cycles with a constant frequency. In principle, only the direction and the velocity of the target are measured in this preguidance phase. The illumination is, in general, discontinuous (for example, 20 to 50 milliseconds per second).

In practice, it is necessary to lock the frequency of the local oscillator to the frequency of the illuminator (to within the frequency $f_i$) through a phase (or frequency) lock loop operating from the illuminating wave tapped by a rear antenna located on the missile.

Moreover, [00e6]this rear reference allows to approximately the time origin of each processing cycle.

Note:

Information transmission from the launch platform to the missile is possible without disturbing the spectral purity of the illuminating wave.

The time intervals between cycles can be turned to account to transmit coded information with a relatively low transmission rate (for example, estimated missile-target range, estimated radial velocity, predicted number of targets in the angular interval of the homing head, command for selection of a target, etc.).

There is now described in a more detailed way the architecture of the radar. There is first described the transmitter and the local oscillator with reference to FIG. 13.

A very stable reference microwave oscillator constitutes the local oscillator 21 ($f_{ol}$). The transmitter 22 ($f_0$) is locked in phase to the local oscillator through a further stable oscillator 23, at intermediate frequency $f_i$ ($f_i=f_o-f_{ol}$) by means of a phase-bocked loop including a synchronous detector 24, an amplifier 25 and a filter 26 with a transfer function H(p). The bandwidth of the loop is sufficient (for example, a few MHz) to achieve the phase reproduction of the wave from the local oscillator in spite of the chopping related to the elemental transmission cycles with a duration of about 1 millisecond. The transmitter feeds directly the transmitting antenna 27. The local oscillator also feeds directly a further antenna 28 having its radiation directed toward the reception surface.

As this is also shown in FIG. 8, a small fraction of the transmitted wave is down-converted to intermedisite frequency and is used as a reference signal distributed among the reception modules with the suitable gains and phases for the compensation for the transmission leakage. Since the reception modules do not include any balanced mixers, they detect the amplitude noise of the wave from the local oscillator. In particular, the noise power in the useful reception interval centered on the intermediate frequency, can decrease the reception sensitivity.

This disadvantage is eliminated thanks to the insertion, in the output circuit of the local oscillator, of a band-pass filter 29 centered on $f_{ol}$, with a bandwidth $\Delta f < 2f_i$, that attenuates sufficiently the useful frequencies around $f_{ol}+f_i$ (by 10 to 15 dB, for instance).

As to the reception antenna, the radiating elements (for example, dipole antennas) are located on a plane surface, in general with a circular contour. They are spaced by about $\lambda/2$ ($\lambda$ is the transmission wavelength). Their number M is usually a few tens for a small-sized missile (M=50 to 100, for example, for a missile of about 15 cm in diameter).

The architecture of the reception modules has been described previously with reference to FIG. 8. It can be added that, if the amplitude modulation lines or noise associated with the transmission leakage, or the near ground clutter echoes are sufficiently low, the very close correlation between the instantaneous phases of the waves from the local oscillator and the transmitter may allow to eliminate the compensation circuits. A filter for selecting the useful interval, at intermediate frequency, is sufficient for this purpose. As a matter of fact, after down-conversion to intermediate frequency, these spurious signals with quasi-zero delay (in the scale of the modulation periods of the spurious signals) are in the form of very highly attenuated lines or noise. This filter must be inaerted directly at the output of the low-gain amplifier to avoid the saturation of the amplifiers that follow.

On the other hand, if the compensating device is necessary, it is preferable to provide an automatic adjustment of the amplitude and phase of the compensating signal in order to follow the slow variations of the leakage signal due to various causes such as temperature changes, component aging, mechanical stresses, etc; A control loop with a very narrow bandwidth (a few hertz, for instance) will[00c6]perform this automatic compensation based on the continuous comparison of the leakage signal F with the compensation signal C, which can easily be achieved: for example, the compensation signal is applied every two cycles, which allows to measure C+F and F separately at a point suitably chosen in the reception system, hence to generate F and C, then finally their phase difference $\epsilon\phi$ and their amplitude difference $\epsilon_a$ that constitutes the closed-loop control errors, that are decoupled with respect to one another, and that, after filtering and amplification, control $A_m$ and $\phi_m$.

With regard to the analog[00f9]to[00f9]digital conversion, the useful frequency interval $\Delta f_d$ being a few tens of kHz, between 2 $V_M/\lambda$ and 2 $V_{r\,max}$ (for example, 2 $V_M/\lambda$=50 kHz and 2 $V_{r\,max}/\lambda$=100 kHz), the signal can be represented by samples spaced by a maximum equal to $\frac{1}{2}\Delta f_d$. In practice, it is possible to take samples spaced by $1/\Delta f_d$ provided they are taken simultaneously on the two components in quadrature of the signal.

As the spurious signals have been previously quasi-fully eliminated, the dynamic range of the signals to be converted is relatively narrow (40 to 50 dB, for instance).

Example: If $\Delta f_d$=50 kHz, the complex samples from each module will be taken every 20 $\mu$s and converted into 8-bit words. A conventional complex analog-to-digital converter capable of converting[00c6]to 8-bit words at a rate of one sample every 0.4 s is therefore capable of sampling sequentially 20/0.4=50 reception channels in parallel. Depending on the number of modules, in general one or two complex conventional analog-to-digital converters will be sufficient to ensure the digital data rate corresponding to all the modules with the usual steps of input/output multiplexing.

With respect to the Doppler filtering, this step is[00c6] performed by a discrete Fourier transformation (DFT) acting on the K samples of each cycle taken at the times $t_1, t_2, \ldots, t_K$, and this for each of the modules (see FIG. 14).

The module with the rank m gives the successive complex samples:

$s'_m(t_1), s'_m(t_2), \ldots, s'_m(t_K)$ spaced by $1/\Delta f_d$, where $K=T\Delta f_d$ and m=1, 2, ..., M.

At the output of the DFT operator, we obtain K parallel signals constituting the bank of filters of the useful interval associated with each module:

$S'_{m1}, S'_{m2}, \ldots, S'_{mk}$ (k=1, 2, ..., K).

The bandwidth of each filter is $\Delta f_d = 1/T = f_d/K$.

The rank of the filter defines the Doppler frequency $f_{dk}$ of the target to within about $\pm\frac{1}{2}$ T.

Example:

If $f_d = 50$ kHz and $T = 10^{-3}$s, we have:

K=50 and $\Delta f_d = 1$ kHz.

At this level of an elemental module, the energy budget is generally too low to allow the identification of the filters where there possibly are useful signals. A linear integration of the homologous signals from all the modules is necessary before performing the usual steps of detection and measurement of the parameters. This is the purpose of the processing achieving the formation of the beams by computation.

Regarding the formation of the reception beams through computation, the M simultaneous output signals corresponding to the Doppler frequency $f_{dk}$ are applied to a Fourier transformation operator with two orthogonal dimensions, X and Y, [00e6]generally horizontal and vertical, respectively (see FIG. 15).

If there are $M_x$ sources in the direction X, and $M_y$ sources in the direction Y: we get $M_x \times M_y = M$.

The output signals $\Sigma_{1k}, \Sigma_{2k}, \ldots, \Sigma_{Mk}$ allow to identify the beams where there possibly are targets with a Doppler frequency $f_{dk}$.

With each filtering channel of rank k is therefore associated a two-dimensional discrete Fourier transform of M points.

If there is a signal in channel $\Sigma_{lk}$, this signal comes therefore from a useful target located in the direction $\theta_l$ and with a Doppler shift $f_{dk}$. The radial velocity-direction domain is therefore divided into MK resolution cells, all of them coming from the processing of one cycle with a duration T.

In the real case where the signals of the modules are taken by a single[00c6] and fast analog-to-digital converter, the input signals $S'_{mk}$ of the two-dimensional spatial DFT are no longer strictly simultaneous. If, between two samples with the ranks i and j, respectively, there is a time difference $\delta T_e$, it is necessary to previously correct the phase difference between the samples $S'_{ik}$ and $S'_{jk}$ due to the Doppler shift $f_{dk}$ in question:

$$\Delta\phi_{i,j} = 2\pi f_{dk} \delta T_e.$$

This phase difference, known a priori, is applied with the suitable sign to the input of the two-dimensional DFT.

If the M modules are sampled regularly in the order of their rank with a period $T_e$, the phase difference to be corrected is proportional to the rank of the module:

$$\Delta\phi_{(m, m-1)} = 2\pi f_{dk} \delta T_e$$

(m=2, 3, ..., M), $$\Delta\phi_{(m, 1)} = 2\pi(m-1) f_{dk} \delta T_e.$$

Example:

If $\delta T_e = 0.4$ µs, $f_{dk} = 50$ Hz, M=100 et T=11 ms, we get:

$\Delta\phi_{(m, m-1)} = 2\pi 5 \times 10^4 \times 0.4 \times 10^{-6}$, $\Delta\phi_{(m, m-1)} = 7.2°$, $\Delta\phi_{(m, 1)} = 99 \times 7.2° = 713°$.

The Doppler shift of the target is known with a precision of about ±500 Hz (that is about 7° for the maximum phase difference $\Delta\phi_{(m, 1)}$, which is quite tolerable.

Notes:

1. The DFT operator processes in general the input signals after a weighting in amplitude and/or in phase intended to minimize the side-lobes.

2. Any other linear or adaptive operator can be applied to the signals $S'_{mk}$, (m=1, 2, ..., M), in order to optimize the reception patterns as necessary.

With respect to the detection and the extraction of the velocity, direction and range parameters, the detection is performed by conventional means with a fixed or locked threshold (devices with constant false alarm rate), either from the KM velocity-direction cells associated with each elemental cycle, or from the coherent or non-coherent integration of the signals from the processing of the successive cycles, as described above.

The determination of the rank (k, l) of the cell where the detection has taken place gives the direction and the radial velocity, of the target. The range, if necessary,is obtained through processing of successive cycles, as described above.

The advantages of the proposed system consist, for one thing, in operational advantages and, for another thing, in technical and technological advantages.

Operational advantages:

the instantaneous scanning of a wide angular field makes possible a low-precision target designation and a late activation of the homing head. It allows a permanent estimation of the environment: number and direction of the possible jammers and targets, generation of selection criteria for targets (in association with the velocity and range parameters);

increase of the antijam capabilities:

a) capability to produce, through processing, nulls in the direction of the jamming sources (theoretically, M reception modules allow to produce M−1 nulls);

b) low detectability of the missile homing head in the transmission mode, compared to a conventional solution:

the gain of, the transmitting antenna is low;

for a given average radiated power, the use of a continuous wave allows to reduce the peak power compared to a conventional high-PRF wave in a ratio of about 3 to 5;

the energy efficiency of the transmission-reception circuitry is considerably improved: the microwave ohmic loss is reduced, the use of a continuous wave eliminates the processing losses due to eclipses and to the sampling of the received pulses. All things being equal, the transmitted power can be reduced.

c) the jamming power received by each module is divided approximately by M compared to the power that would be received by an antenna with a single receiver (mechanical antenna or passive electronic antenna). All things being equal, the overall jamming power received by the antenna can therefore be multiplied by H before reaching the saturation level of the modules, which means in practice that the missile can approach a jamming source up to a distance $\sqrt{M}$ shorter before the processing devices for the jamming signals become ineffective (tracking of a target carrying a jammer, elimination of offset jammers, etc.).

compatibility between several flying missiles easy to ensure due to the very narrow instantaneous spectral width of the transmission (about 1000 Hz instead of a few MHz).

Technical and technological advantages

The proposed architecture allows to achieve a high-performance missile homing head with relatively low-cost manufacturing, adjustment and overall final development methods. These advantages area essentially related to the simplicity of the transmitted waveform and the simplicity of the reception modules.

Simplicity off the transmitted waveform:
- a) the transmitter is simple because it supplies a quasi-continuous wave: the peak power and the supply voltages are therefore minimum. The permissible tolerance on the steepness and the position of the leading edge and trailing edge of each cycle is very large, contrary to the case of the high-PRF or medium-PRF radars, that necessitate a high spectral purity of the chopping waveform;
- b) the processing losses related to the eclipses and to sampling in conventional radars are eliminated. One can estimate to about 5 dB the gain thus obtained with respect to a high-PRF wave (duty cycle of about 0.5 to 0.25);
- c) the local oscillator can be locked to the really transmitted wave (or conversely), contrary to the case of pulse radars, where it can be locked only to the transmission reference wave before modulation by the chopping pulse train.

The frequency noise and the spurious lines are therefore identical (at least in a wide frequency band) for the transmitted wave and the wave from the local oscillator. After down conversion to intermediate frequency, the signals whose delay is zero or low exhibit an associated frequency noise equal to zero or highly attenuated. This advantage is particularly interesting in the case of spurious signals of very high level constituted by the transmission leakage (quasi-zero delay) and the near ground clutter echoes in the case of very low altitude flight.

The pollution of the useful spectral region by these high-level signals can thus be considerably reduced.

Example:

Let us consider a powerful ground clutter echo whose delay is $\tau_0 = 2\ \mu s$ (d=300 m).

If the transmitted wave includes a spurious line located at $f_m = 10$ kHz from the carrier $f_0$, with a relative amplitude $\Delta\phi_e$ ($\Delta\phi_e$ is the modulation factor), the relative amplitude of the spurious line associated with the received signal will be:

$$\Delta\phi_r = 2\Delta\phi_e \sin \pi f_m \tau_0,$$

that is $$\Delta\phi_r = 2\Delta\phi_e \sin \pi \times 10^4 \times 2 \times 10^{-6} = 2\Delta\phi_e \sin 2\pi \times 10^{-2},\ \Delta\phi_r = 0.125\ \Delta\phi_e.$$

The spurious line is therefore attenuated by 18 dB (it would be attenuated by 38 dB for the echo of a reflecting object at 30 meters).

- d) the non-ambiguous range interval can be much larger than with [00e6]a conventional high-PRF radar;
- e) The proposed waveform does not necessitate the use of very stable clocks for the sampling of the received signals (in particular[00c6] in microwave frequency and intermediate frequency).

Simplicity of the reception modules:
- a) the microwave losses are very low:
  absence[00c6] of rotary joint for both transmission and reception;
  the length of the transmission line for the received signal is quasi-zero, the mixer being directly associated with the radiating element;
- b) quasi-total absence of microwave components (in particular phase shifters and attenuators), making the manufacturing cost relatively low.
  Only the mixer diode remains.
- c) absence of physical microwave links between the reference oscillators (transmission wave and/or local oscillator) and the modules, which makes the assembly structure of the module much simpler than in the case of a conventional active antenna;
- d) absence of individual adjustments on the modules to compensate for the gain and phase differences due to manufacturing and assembly imperfections. The adjustments of relative gain and phase before formation of the beams are carried out only for the output signals of the modules thanks to an overall test (for example, illumination of the whole antenna by an external source radiating a plane wave);
- e) in spite of this simplicity, all the capabilities of the antenna with separated transducers are retained.

The proposed architecture is applicable to all types of radars. It is very advantageous every time the energy budget is not essential and the surveillance of airspace must be instantaneous and the angular measurements must be precise.

For example, in addition to missile radars:
airborne radars for terrain avoidance or terrain following;
short-range ground radars (fixed [00e6]or mounted on vehicles) for very rapid-reaction weapon systems;
in the passive mode: angular localization of external sources in the frequency band of operation (other radars, jammers, etc.).

The proposed method appears particularly interesting in the case of millimiter-wave radars (around 100 GHz, for instance), where the conventional architectures of the phased-array antennas of the passive and active types require costly microwave components and circuits, as well as assembly methods difficult to[00c6] implement.

The proposed architecture can easily be simplified if the tradeoffs resulting from this simplification are operationally tolerable. If it is desired either to reduce the number of independent modules or to reduce the number of calculations (for a given number of independent modules), various solutions are possible. A few of them are given hereinafter as examples:

the antenna uses a conventional mechanical scanning in one plane and simultaneous reception beams in the other plane:

The antenna can be made up of a conventional assembly of waveguide sections with radiating slots, producing the directivity of the beam in the direction normal to the plane of the guides. With each guide is associated a reception circuit, the two constituting a module. The great decrease of the number of independent modules and of the number of calculations (in particular, the spatial DFT is one-dimensional) translates into an increase of the scanning time of airspace and a lack of flexibility in the plane of mechanical scanning.

Note;

The antenna with a wide radiation pattern that radiates the reference wave from the local oscillator must be geometrically tied to the moving radiating surface.

the antenna uses sequential electronic scanning in one plane and simultaneous beams in the other plane.

The corresponding architecture is illustrated in FIGS. 16 and 17. As shown in FIG. 16, the rectangular antenna includes M=P×Q modules disposed in a matrix array of P horizontal lines and Q vertical columns.

Each of the modules is identified by the pair (p, q). It comprises the radiating element, the mixer, the preamplifier, and, possibly, the circuit for compensation for the transmission leakage. As shown in FIG. 17, the Q signals at intermediate frequency coming from the modules $15_{pq}$ of one and the same line with the rank p are summed in a summing circuit 30 after an adjustment, by means of the phase shifters $31_{pq}$, compensating for the phase differences between modules and the application of the phase law, linear with the rank q, allowing the sequential steering of the beam in the horizontal plane.

The resulting signal then undergoes the analog processing already described (filtering of the ground clutter echoes, down conversion, amplification, etc.). It is then converted to digital form and applied to the DFT operator performing the Doppler filtering. There is then[00c6] available, for each Doppler channel, P simultaneous signals allowing to compute P simultaneous beams in the vertical plane. In each elemental cycle, there is therefore available only PK velocity-direction resolution cells. The set of MK cells will be scanned at best in a time corresponding to Q elemental cycles.

This disadvantage is compensated[00c6] for by a simplification of the elemental modules and a significant reduction of the number of calculations.

However, this architecture remains relatively flexible; in particular, it allows to easily interchange the roles of the two planes (sequential electronic scanning in a vertical plane and simultaneous beams in an horizontal plane) if P and Q are comparable, by using different arrays.

I claim:

1. A radar with a wide instantaneous angular field and a high instantaneous angular resolution, comprising:
    a transmitting antenna having a radiation pattern covering all of said angular field, for transmitting a quasi-continuous wave consisting of successive elemental waves regularly spaced and having substantially constant amplitude;
    a receiving antenna having a plurality of radiating elements;
    means for forming beams associated with the receiving antenna, to obtain a linear combination of the signals coming from the various radiating elements of the receiving antenna, to obtain a group of simultaneous reception beams allowing the instantaneous scanning of the airspace covered by the transmission beam; and
    means for processing the phases of said signals coming from the various radiating elements with respect to corresponding successive elemental waves, to extract at least a velocity of a target located in said angular field.

2. A radar according to claim 1, wherein said receiving antenna is a two-dimensional array of radiating elements for forming simultaneous reception beams along both dimensions of said array.

3. A radar according to claim 1, further including means for compensating for differential phases between the signals coming from the various radiating elements of the receiving antenna, before formation of the reception beams.

4. A radar according to claim 1, wherein said means for processing comprise means for Doppler filtering received signals.

5. A radar according to claim 1, wherein said beam forming means include a DFT operator performing a spatial discrete Fourier transformation on the signals coming from the various radiating elements.

6. A radar according to claim 1, further including a receiver which receiver includes means for compensating for the leakage of the transmitting antenna toward said receiving antenna.

7. A radar with a wide instantaneous angular field and a high instantaneous angular resolution, comprising:
    A transmitting antenna having a radiation pattern covering all of said angular field, for transmitting a quasi-continuous wave consisting of successive elemental waves regularly spaced and having substantially constant amplitude;
    a receiving antenna having a plurality of radiating elements;
    means for forming beams associated with the receiving antenna, to obtain a linear combination of the signals coming from the various radiating elements of the receiving antenna, to obtain a group of simultaneous scanning of the airspace covered by the transmission beam, wherein said receiving antenna is a two-dimensional array of radiating elements for simultaneous reception of beams along a first dimension of said array and with sequential electronic scanning on reception along a second dimension of said array.

8. A radar with a wide instantaneous angular field and a high instantaneous angular resolution, comprising:
    a transmitting antenna having a radiation pattern coverall all of said angular field, for transmitting a quasi-continuous wave consisting of successive elemental waves regularly spaced and having substantially constant amplitude;
    a receiving antenna having a plurality of radiating elements;
    means for forming beams associated with the receiving antenna, to obtain a linear combination of the signals coming from the various radiating elements of the receiving antenna, to obtain a group of simultaneous reception beams allowing the instantaneous scanning of the airspace covered by the transmission beam; and
    means for Doppler filtering received signals, wherein said Doppler filtering means are coupled in circuit between said receiving antenna and said beam forming means for forming.

9. A radar with a wide instantaneous angular field and high instantaneous angular resolution, comprising:
    a transmitting antenna having a radiation pattern covering all of said angular field, for transmitting a quasi-continuous wave consisting of successive elemental waves regularly spaced and having substantially constant amplitude;
    a receiving antenna having a plurality of radiating elements;
    means for forming beams associated with the receiving antenna, to obtain a linear combination of the signals coming from the various radiating elements of the receiving antenna, to obtain a group of simultaneous reception beams allowing the instantaneous scanning of the airspace covered by the transmission beam; and
    means for Doppler filtering received signals, wherein said beam forming means for formation of reception beams are coupled in circuit between said receiving antenna and said Doppler filtering means.

10. A radar with a wide instantaneous angular field and a high instantaneous angular resolution, comprising:
    a transmitting antenna having a radiation pattern coverall all of said angular field, for transmitting a quasi-continuous wave consisting of successive elemental waves regularly spaced and having substantially constant amplitude;
    a receiving antenna having a plurality of radiating elements;

means for forming beams associated with the receiving antenna, to obtain a linear combination of the signals coming from the various radiating elements of the receiving antenna, to obtain a group of simultaneous reception beams allowing the instantaneous scanning of the airspace covered by the transmission beam; and means for Doppler filtering received signals, wherein said Doppler filtering means include a DFT operator performing a temporal discrete Fourier transformation, acting symmetrically on the input samples of a filtering cycle, distributed symmetrically around the time $t''=\tau OM+(T-\tau_{OM})/2$, where t'' denotes the time counted from the beginning of the filtering cycle in question, T denotes the duration of the filtering cycle, and $\tau_{OM}$ denotes a fixed delay corresponding to the estimated maximum delay for the received signals, the delay for the received signals being the spacing between the beginning of the transmitted signals and the beginning of the received signal.

11. A radar according to claim 10, wherein said duration of a filtering cycle is equal to the duration of the transmitted elemental waves.

12. A radar according to claim 10, wherein the transmission frequency is constant from one filtering cycle to the next cycle.

13. A radar according to claim 10, wherein the transmission frequency is variable from one filtering cycle to the next cycle.

14. A radar according to claim 10, wherein the filtering cycles are regularly spaced in frequency.

15. A radar according to claim 10, wherein said means for processing include in addition means for measuring the range of the targets.

16. A radar according to claim 15, wherein said means for measuring the range of the targets include a discrete Fourier transformation (DFT) operator to which are applied:

in a first phase, the signals obtained at the output of same rank of the DFT operator for Doppler filtering, for N successive filtering cycles forming a first filtering sequence of the type with constant frequency form one filtering cycle to the next cycle;

in a second phase, the signals obtained at the output of same rank of the DFT operator for Doppler filtering, for N successive filtering cycles forming a second filtering sequence of the type with filtering cycles regularly spaced in frequency.

17. A radar according to claim 15, wherein said means for measuring the range of the targets includes means for measuring the phase difference, firstly between the signals obtained at the output of same rank of the DFT operator for Doppler filtering, for two filtering cycles at the same frequency $f_1$ and, secondly, between the signals obtained at the output of same rank of the DFT operator for doppler filtering, for two filtering cycles, one of them at a frequency $f_1$ and the other at a frequency $f_1+\delta f$, $\delta f$ being a predetermined frequency increment.

18. A radar according to claim 10, wherein the signals obtained at the output of same rank of the DFT operator for Doppler filtering, for N successive filtering cycles, are applied to a DFT operator in order to improve the velocity resolution.

19. A radar according to claim 10, wherein there is performed an integration of the amplitude of the signals obtained at the output of same rank of the DFT operator for Doppler filtering, for N successive filtering cycles, in order to improve the signal-to-noise ratio.

20. A radar with a wide instantaneous angular field and a high instantaneous angular resolution, comprising:

a transmitting antenna having a radiation pattern covering all of said angular field, for transmitting a quasi-continuous wave consisting of successive elemental waves regularly spaced and having substantially constant amplitude;

a receiving antenna having a plurality of radiating elements;

means for forming beams associated with the receiving antenna, to obtain a linear combination of the signals coming from the various radiating elements of the receiving antenna, to obtain a group of simultaneous reception beams allowing the instantaneous scanning of the airspace covered by the transmission beam; and a local oscillator that feeds an auxiliary antenna of small size, located at the back of the transmitting antenna and illuminating all said radiating elements of said receiving antenna.

21. A radar according to claim 20, including a receiver including having a frequency converter stage which converter stage includes a mixer diode connected to each of the radiating elements of said receiving antenna.

* * * * *